(12) United States Patent
Mahan et al.

(10) Patent No.: US 8,210,435 B2
(45) Date of Patent: Jul. 3, 2012

(54) OPTICAL POSITION MARKER APPARATUS

(75) Inventors: Larry G. Mahan, Newark, DE (US); Sarah M. Brisbin, Aston, PA (US); Kimberly M. Martine, Wilmington, DE (US)

(73) Assignee: Sky-Trax, Inc., New Castle, DE (US)

( * ) Notice: Subject to any disclaimer, the term of this patent is extended or adjusted under 35 U.S.C. 154(b) by 843 days.

(21) Appl. No.: 12/319,825

(22) Filed: Jan. 13, 2009

(65) Prior Publication Data

US 2009/0180667 A1    Jul. 16, 2009

Related U.S. Application Data

(60) Provisional application No. 61/011,084, filed on Jan. 14, 2008.

(51) Int. Cl.
*G06K 7/10* (2006.01)
(52) U.S. Cl. .................... 235/462.01; 382/103
(58) Field of Classification Search ............. 235/462.01; 382/103
See application file for complete search history.

(56) References Cited

U.S. PATENT DOCUMENTS

| | | |
|---|---|---|
| 4,684,247 A | 8/1987 | Hammill, III |
| 5,525,883 A | 6/1996 | Avitzour |
| 5,617,335 A | 4/1997 | Hashima et al. |
| 5,793,934 A | 8/1998 | Bauer |
| 5,832,139 A | 11/1998 | Batterman et al. |
| 5,893,043 A | 4/1999 | Moehlenbrink et al. |
| 6,556,722 B1 | 4/2003 | Russell et al. |
| 6,661,449 B1 | 12/2003 | Sogawa |
| 6,697,761 B2 | 2/2004 | Akatsuka et al. |
| 6,728,582 B1 | 4/2004 | Wallack |
| 7,372,451 B2 | 5/2008 | Dempski |
| 7,667,646 B2 | 2/2010 | Kalliola et al. |
| 7,681,796 B2 | 3/2010 | Cato et al. |
| 7,845,560 B2 | 12/2010 | Emanuel et al. |
| 2003/0034396 A1 | 2/2003 | Tsikos et al. |
| 2003/0094495 A1 | 5/2003 | Knowles et al. |

(Continued)

FOREIGN PATENT DOCUMENTS

EP    0367526    5/1990

(Continued)

OTHER PUBLICATIONS

International Search Report dated Nov. 6, 2006.

(Continued)

*Primary Examiner* — Daniel Hess
*Assistant Examiner* — Rafferty Kelly
(74) *Attorney, Agent, or Firm* — Pepper Hamilton LLP

(57) ABSTRACT

An apparatus for marking predetermined known overhead positional locations within a coordinate space, for viewing by an image acquisition system. The apparatus comprises a plurality of marker tags, grouped in one or more rows, each row having an axis, each row being supported by a row support. Each marker tag comprises an optically opaque, dark colored corrugated substrate, substantially rectangular in shape. A label having a unique machine-readable barcode symbology printed thereon is positioned centrally on the substrate so that a dark colored border of the substrate surrounds the label. Each row support comprises a first support cord and a second support cord. The first support cord supports a first lateral edge of the marker tags in a row group in a fixed, spaced-apart positional arrangement. The second support cord supports the second lateral edge of the marker tags in the row in a slidable support arrangement.

9 Claims, 5 Drawing Sheets

U.S. PATENT DOCUMENTS

| | | |
|---|---|---|
| 2004/0016077 A1 | 1/2004 | Song et al. |
| 2004/0183751 A1 | 9/2004 | Dempski |
| 2005/0046584 A1 | 3/2005 | Breed |
| 2005/0269412 A1 | 12/2005 | Chiu et al. |
| 2006/0022872 A1 | 2/2006 | Zimmerman |
| 2006/0184013 A1 * | 8/2006 | Emanuel et al. .............. 600/426 |
| 2007/0219720 A1 | 9/2007 | Trepagnier et al. |

FOREIGN PATENT DOCUMENTS

| | | |
|---|---|---|
| EP | 1437636 | 7/2004 |

OTHER PUBLICATIONS

International Search Report dated Oct. 14, 2011.

* cited by examiner

OPTICAL POSITION MARKER APPARATUS

Benefit of U.S. Provisional Application 61/011,084, filed Jan. 14, 2008 is claimed.

RELATED APPLICATION

PCT/US2005/043755, published as WO2006/065563, Method and Apparatus for Determining Position and Rotational Orientation of an Object.

BACKGROUND OF THE INVENTION

Determining the position and rotational orientation of an object within a defined space is a practical problem that has brought many solutions. For example, Global Positioning Systems (GPS) is a widely recognized position determination technology, but it lacks rotational orientation determination capability for stationary objects. GPS operability suffers indoors from signal attenuation and reflections, so it is not a good choice for indoor applications. Ultrasonic methods that operate well indoors have been designed to replicate GPS capability, but they, too, lack rotational orientation determination. In prior art optical position location systems various markers are used.

PRIOR ART

U.S. Pat. No. 6,556,722 discloses a method, wherein circular barcodes are utilized to indicate reference positions within a television studio. In this optically based method, a television studio camera is equipped with a secondary camera which views position markers set onto the studio ceiling in known locations. The markers are constructed of concentric ring barcodes which are developed specifically for that purpose. Camera position is determined by capturing an image of at least three markers and performing geometric analysis in a digital computer to determine accurate location within the three-dimensional studio space. The invention discloses proprietary circular ring barcodes, which cannot be read by commercial machine vision systems, and requires a multiplicity of markers to be within view.

U.S. Pat. No. 5,832,139 discloses a method and apparatus for determining up to six degrees of freedom of a camera relative to a reference frame which comprises an optically modulated target with a camera and processing the camera's output video signal with a digital computer. The target may have a single pattern, multiple patterns, or patterns of varying size, and multiple targets may be used. The invention analyzes the parallax, or "warping" of square target patterns into non-square quadrilaterals within the field of view in order to determine six degrees of freedom of the camera. It does not present common barcode symbols as a choice for passively modulated targets, and does not use the inherent identity of barcode symbols for both automated means and non-automated position determination means.

A number of machine vision-based systems exist, especially for vehicle and robot guidance, however, most analyze physical surroundings by viewing downward toward floor markings, or horizontally toward local scenery or reflective markers. For example, U.S. Pat. No. 6,728,582 provides a system and method for estimating the position of an object in three dimensions using two machine vision cameras interconnected with a machine vision search tool. A nominal position for each camera's acquired image of the object is determined and a set of uncertainty vectors along each of the degrees of freedom is generated. This method requires viewing multiple objects with multiple cameras in order to make the weighted estimation of the position of the object.

In view of the foregoing, there is a need for a simple, easy to install, optical position marker apparatus useful with image acquisition systems such as machine vision and navigation systems.

SUMMARY OF THE INVENTION

An apparatus for marking predetermined known overhead positional locations within a coordinate space, for viewing by an image acquisition system, is disclosed. The apparatus comprises a plurality of marker tags, the marker tags being grouped in one or more rows, each row having an axis, the marker tags in a row being supported by a row support. Each marker tag comprises an optically opaque, dark colored corrugated substrate, substantially rectangular in shape. An adhesive-backed label having a unique machine-readable barcode symbology printed thereon is positioned centrally on the substrate so that a dark colored border of the substrate surrounds the label. Each row support comprises a first support cord and a second support cord. The first support cord supports a first lateral edge of the marker tags in a row group in a fixed, spaced-apart positional arrangement. The second support cord supports the second lateral edge of the marker tags in the row in a slidable support arrangement. The first support cord is attached to an overhead support structure at each end with a tensioning device and the first support cord is drawn to a predetermined tension, thus establishing a substantially straight first lateral row edge. The tensioning devices on the first support cord permit precise positioning of the marker tag group along the row axis. The second support cord is also attached to the support structure at each end with a tensioning device and the second support cord is drawn to substantially the same tension of the first cord, so that the marker tags are supported in a substantially horizontal plane. The slidable support of the second edge allows the marker tags of a row group to align along the first lateral edge and eliminates any skewing of the marker tags due to unequal tensions in the support cords. A spreader bar is provided at each end of the support cords to establish a fixed spacing of the support cords corresponding to the spacing of the first and second lateral edges of the marker tags, thus preventing the application of lateral forces to the substrates.

DETAILED DESCRIPTION OF THE INVENTION

The present invention is an improved optical position marker apparatus usable with the system of the related application, PCT/US2005/043755 WO2006/065563, incorporated herein by reference, for the tracking of vehicles and stored goods within a warehouse or factory setting which requires a plurality of individually unique position markers, arranged at predetermined known positional locations. As described in the related application, in a factory or warehouse setting, the object to be located is typically on the floor, and the position markers are placed overhead. The overhead support structure, such as a roof truss support, is sufficiently high above the working area so as not to interfere with operations.

Figure 1:
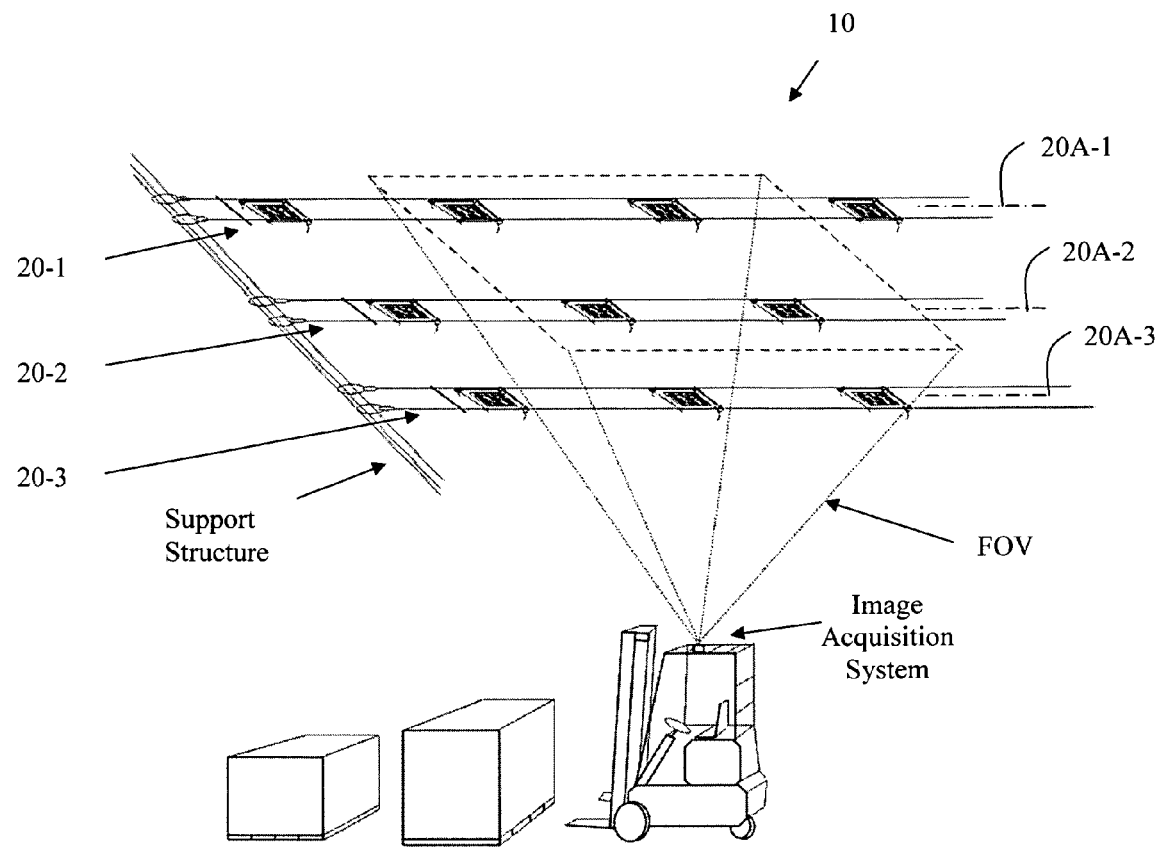
FIG. 1 illustrates an arrangement of a position marker apparatus having multiple row groups of overhead optical position marker tags in accordance with the present invention.

FIG. 1 illustrates the apparatus 10 of the present invention in use in the system of the related application. The optical position marker apparatus 10 described herein allows light to pass from overhead light fixtures to the work area, and air to flow freely for heating and ventilation. Suspension of the optical position marker apparatus 10 is provided by mechanical supports, such as overhead beams or trusses of a building structure. The apparatus 10 comprises one or more row groups 20, illustrated as row groups 20-1, 20-2, 20-3 in FIG. 1.

Figure 3:
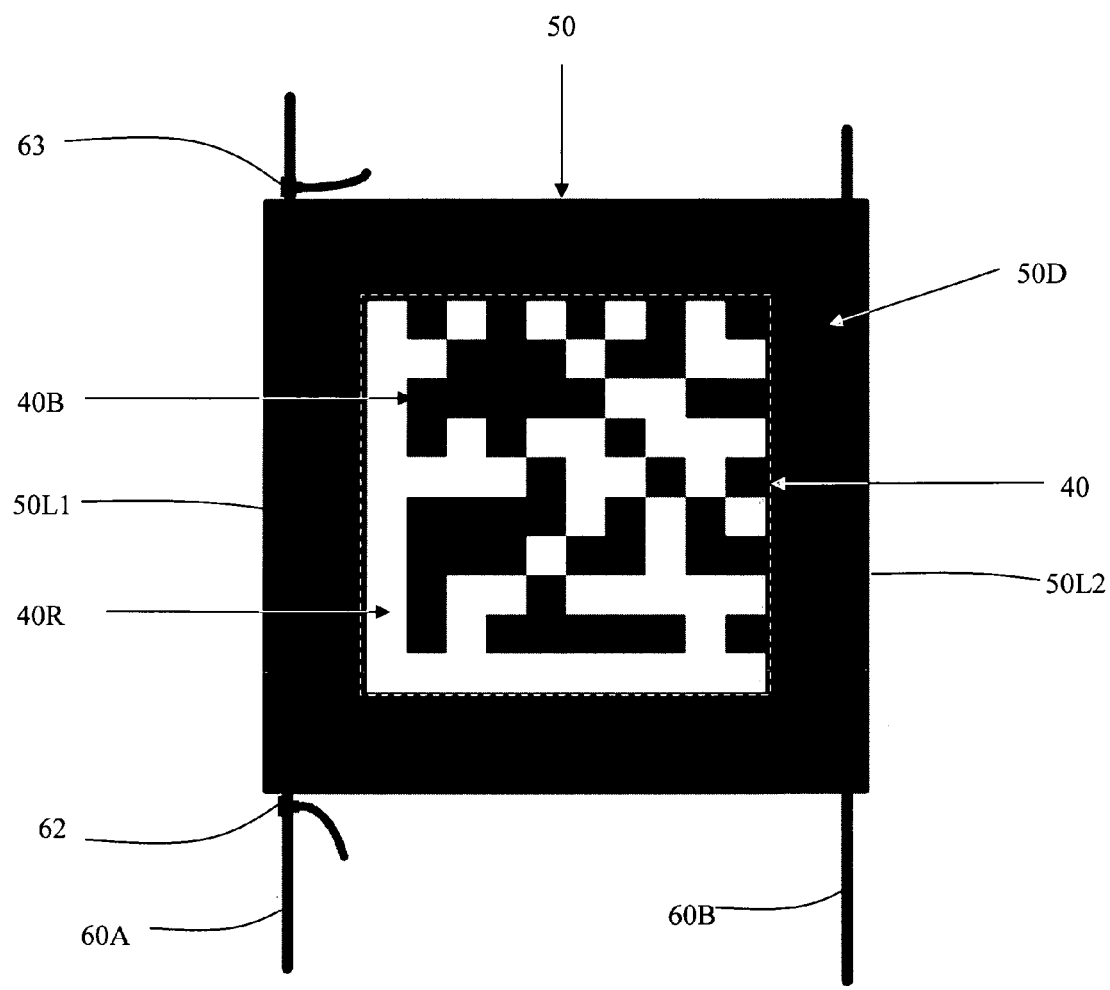
FIG. 3 is an enlarged plan view of a marker tag.

As described in the related application, an image acquisition system is mounted on an object, such as an industrial materials handling vehicle, typically a forklift. The field of view FOV of the image acquisition system is shown in dashed lines as an inverted pyramid. The image acquisition system acquires an image of one or more position markers within view and the image is then decoded by commercially available machine vision equipment to determine the identity of the one or more position markers. The location of a position marker with the acquired image is then used to determine the position and rotational orientation of the object. Each position marker 30 (best seen in FIG. 3) bears a unique barcode symbol 40B that contains a rotational orientation feature 40R, thereby identifying both the position coordinate and rotational orientation of the position marker within the predefined coordinate space. The position and rotational orientation in "real" space are them computed from machine vision data using a series of programmed instructions which translate the relative positional and rotational orientation data to coordinates expressed in usable units such as feet or meters relative to a know datum. Results are stored, displayed, and/or transmitted to another system, such as an inventory control system, where data may be used to record object location, to direct vehicle guidance, or for other navigation or control purposes.

Although only one position marker must be within view of the object, if more than one position marker is within view (as seen in FIG. 1) the position and rotational orientation of the object may be calculated from each position marker within view to verify and improve the precision of the position and rotational determination.

A marker tag 30 is created by affixing a label 40 (FIG. 3) to a substantially stiff substrate 50 to add mechanical strength. A corrugated plastic substrate, such as black polypropylene corrugated sheeting, four millimeters thick, available under the trade name Coroplast, from Coroplast Corporation of Dallas, Tex., is preferred since it provides for easy attachment of the support system. The corrugated plastic substrate is sized larger than the barcode label to provide a dark border 50D (FIG. 3), termed an "optical quiet zone", around each barcode symbol 40B. For clarity of illustration, in FIG. 3 the substrate 50 is cross hatched, so that the individual elements, i.e. the label 40, the barcode symbol 40B and the rotational orientation feature 40R may best be seen.

The dimensions of a marker tag substrate 50 and the barcode symbol 40B are selected according to the desired field of view for the camera of an image acquisition system and the distance between the camera and the elevation of the position marker apparatus 10. Barcode symbols ranging from about three centimeters square to about twenty-four centimeters square have been used. Barcode symbols, each containing a unique identification encoded in two-dimensional barcode symbology are printed on label stock. Retro reflective barcode labels are preferred to improve the contrast of the image and thus the signal-to-noise ratio and the quality of the signal output from the machine vision camera. A retro reflective material sold under the trade name Scotchlite™ from 3M Corporation of St. Paul, Minn. is preferred, although other label stocks available from many suppliers, such as Duratran II thermal transfer label stock, Part No. E06175 available from Intermec Corporation of Seattle, Wash., are suitable. Barcode labels may be printed using a common barcode label printer such as Intermec model 3800 thermal transfer barcode label printer or a commercial inkjet printer such as Roland XC-540 model printer.

Figure 2:
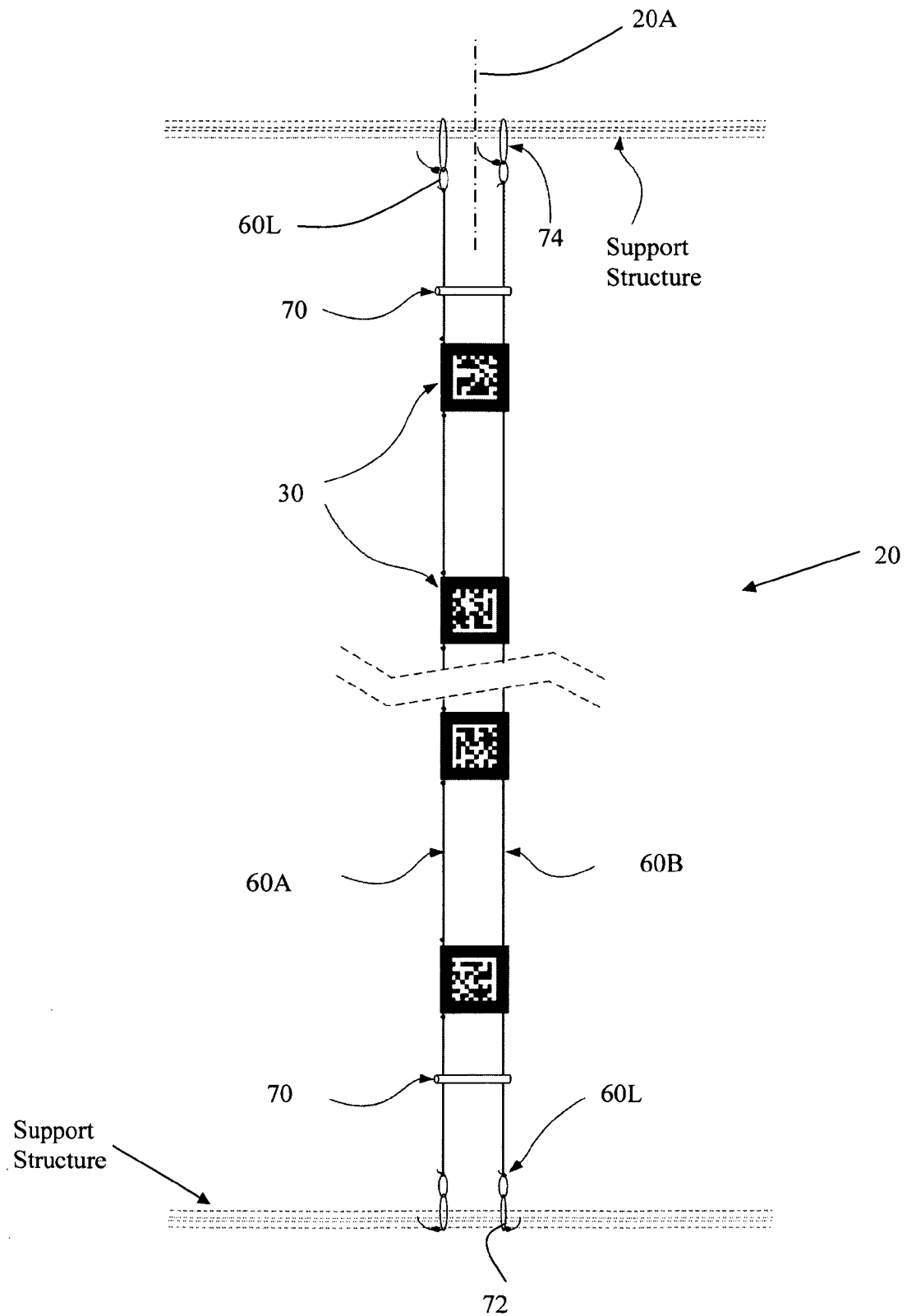
FIG. 2 is a plan view of a row group of marker tags showing the support cords supporting the row group of marker tags, the ends of the support cords having loops through which cable ties pass to attach the row group to a support structure and to adjust the support cord tension.

As may be seen in FIG. 2 the marker tags 30 are attached to a first and second support cords 60A, 60B of a supporting cord or cable assembly 60, known as a row support, in a fixed, spaced-apart positional arrangement to create row groups 20 of marker tags. The support cords 60A, 60B of the support cord assembly 60 should have substantially no stretch. A cord material, such as one eighth inch diameter antenna cable, having a diamond braided polyester outer jacket with a Kevlar® core used for radio antenna support, available from Erin Rope Corporation of Blue Island, Ill., has been found suitable.

Figure 4A:
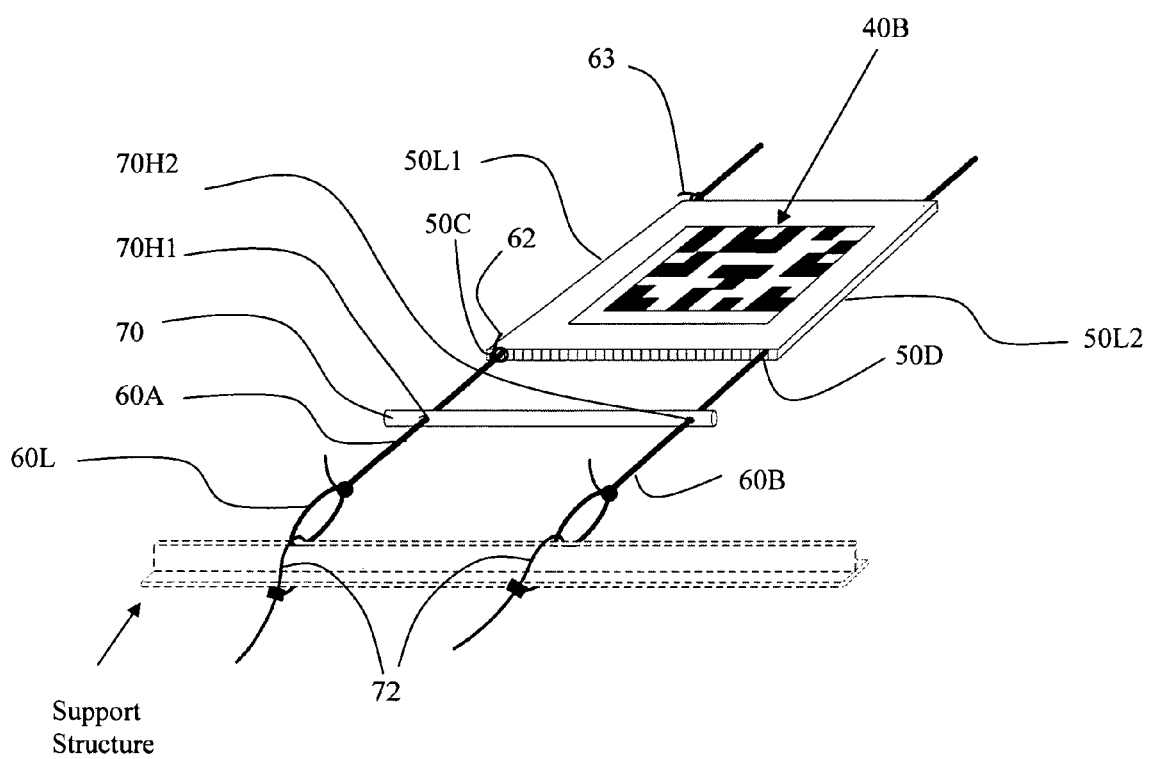
FIG. 4A is a perspective view showing a first attachment arrangement of a marker tag to two support cords, also illustrating the support cords being fed through holes in a spreader bar.

In a preferred embodiment as seen in FIG. 4A (also FIG. 3) a corrugated substrate 50 is used and each support cord 60A, 60B is threaded through a corresponding corrugation channel 50C, 50D adjacent to each lateral edge 50L1, 50L2 of the substrate 50. The first support cord 60B is threaded through a corrugation channel 50C adjacent to the first lateral edge 50L1 of the substrate 50. Two fasteners 62, 63 such as a nylon cable ties, also known as a zip ties, available from NELCO Products Incorporated of Pembroke, Mass., are cinched down tightly on the first support cord 60A, one at each side of the marker tag 30 to hold the marker tag in place on the cord 60A, thus establishing a fixed, spaced-apart positional arrangement (best seen in FIG. 2) for the marker tags 30 in a row group 20. The second support cord 60B is threaded through a corrugation channel 50D adjacent to the second lateral edge 50L2 of the substrate 50 to support the edge in a slidable manner.

Figure 4B:
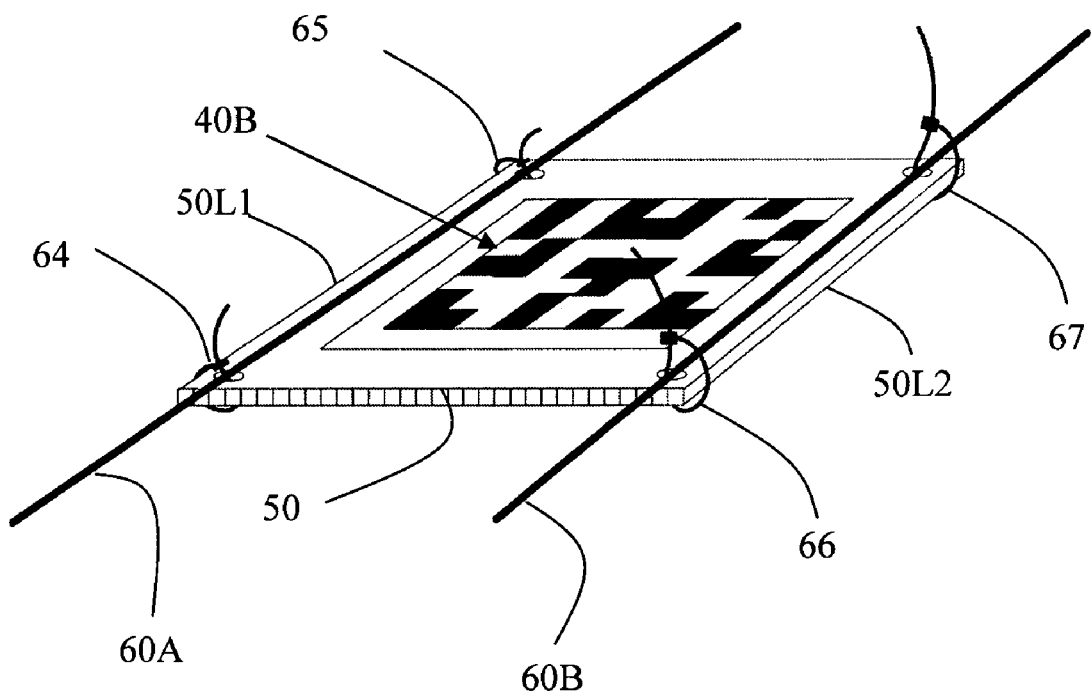
FIG. 4B shows a second attachment arrangement of a marker tag to two support cords.

Alternatively, as shown in FIG. 4B, the first lateral edge 50L1 of each marker tag 30 may be fastened tightly to the first support cord 60A using two or more fasteners 64, 65, such as nylon cable ties, to establish the fixed, spaced-apart positional arrangement for the marker tags 30 in a row group 20. The second lateral edge 50L2 is attached loosely to the second support cord 60B with two additional fasteners 66, 67, such as the nylon cable ties shown, to establish support of the marker tag 30 in a slidable manner, so that the marker tag 30 can move freely on the second support cord 60B.

In both embodiments of FIGS. 4A and 4B, the second support cord 60B supports the second lateral edge 50L2 of each marker tag 30 in a slidable manner. This slidable support of the second lateral edge insures that the marker tags 30 will be aligned along the first lateral edge 50L1, and thus along the row group axis 20A (FIGS. 1 and 2). This slidable support of the second lateral edge thus prevents any skewing tension on the marker tags 30.

As seen in FIGS. 2 and 4A a stiff bar, termed a spreader bar 70, is used at each end 20E1, 20E2 of each row group 20 of marker tags to maintain the support cords 60A, 60B at the proper separation, thus preventing the application of lateral forces to the substrates 50. The spreader bar 70 can be made of any suitable material such as fiberglass composite, metal or plastic. Holes 70H1, 70H2 formed adjacent to each end of the spreader bar 70 receive the corresponding support cords 60A, 60B to establish the support cord spacing.

As best seen in FIGS. 2 and 4A, a loop 60L is created at each end of each support cord 60A, 60B such as by tying a bowline knot, so that the loop will not slip or close up when tension is applied. Tensioning fasteners 72, 74, such as heavy duty cable ties, are then inserted through each loop 60L at the end of each support cord 60A, 60B to serve as tensioning devices. A twenty centimeter (fourteen inch) long heavy duty nylon cable tie available from NELCO Products Incorporated is the preferred tensioning device to attach the support cords to an overhead support structure S. It may be appreciated that by adjusting each fastener 72, 74, the positions of the marker tags 30 of a row group 20 may be precisely established.

As may be appreciated from FIG. 2, the barcode labels 40B of all marker tags 30 in a row group 20 are typically oriented in the same direction relative to the row axis 20A and the substrates 50 are supported with the barcode labels facing downward (FIG. 1) so they may be viewed by an image acquisition system adjacent the floor below. Each row group 20-1, 20-2, 20-3, etc. of marker tags is supported in a straight line along the row axis 20A and the row axes, such as 20A-1 and 20A-2 (FIG. 1), of adjacent rows 20-1, 20-2 are typically parallel to each other.

Those skilled in the art, having benefit of the teachings of the present invention asset forth herein, may effect modifications thereto. Such modifications are to be construed as lying within the contemplation of the present invention, as defined by the appended claims.

What is claimed is:

1. An apparatus for marking predetermined known overhead positional locations within a coordinate space, for viewing by an image acquisition system, the apparatus comprising:
   a plurality of marker tags, the marker tags being grouped in one or more rows, each row having an axis, the marker tags in a row group being supported by a row support,
   each marker tag comprising:
      an optically opaque, substantially stiff substrate, substantially rectangular in shape,
      a label positioned centrally on the substrate, each label having a unique machine-readable barcode symbology printed thereon, a border of the substrate surrounding the label;
   each row support comprising:
      a first support cord for supporting a first lateral edge of the marker tags in a row group in a fixed, spaced-apart positional arrangement, and
      a second support cord for supporting the second lateral edge of the marker tags in the row group in a slidable support arrangement,
      the first support cord being attached to an overhead support structure at each end with a tensioning device, the support cord being drawn to a predetermined tension, thus establishing a substantially straight first lateral row edge, the tensioning devices on the first support cord permitting precise positioning of the marker tag group along the row axis;
      the second support cord being attached to the support structure at each end with a tensioning device, the support cord being drawn to substantially the same tension as the first support cord, so that the marker tags are supported in a substantially horizontal plane, the slidable support of the second lateral edges allowing the marker tags of a row group to align along the first lateral edges.

2. The apparatus of claim 1 wherein each marker tag substrate is comprised of a dark colored substantially stiff corrugated material so that a dark colored border surrounds the barcode label.

3. The apparatus of claim 2 wherein the first support cord is threaded through at least two fasteners attached to the substrate adjacent to the first lateral edge, at least one of the fasteners being attached tightly to the support cord in a fixed arrangement, thus establishing the fixed, spaced-apart positional arrangement of the markers within the row group.

4. The apparatus of claim 3 wherein the second support cord is threaded loosely through at least two support fasteners attached to the substrate adjacent to the second edge to support the edge in a slidable manner.

5. The apparatus of claim 2 wherein:
   the corrugations of each substrate are aligned with the row axis,
   the first support cord is threaded through a corrugation channel adjacent to the first lateral edge of each substrate, and
   a fastener is attached tightly to the support cord immediately adjacent to each end of the corrugation channel, thus establishing the marker tags within the row group in the fixed, spaced-apart positional arrangement.

6. The apparatus of claim 2 wherein the second support cord is threaded through a corrugation channel adjacent to the second edge of the substrate to support the edge in a slidable manner.

7. The apparatus of claim 2 further comprising a first spreader bar to hold the first ends of the first and second support cords at a fixed spacing corresponding to the spacing of the corrugation channels adjacent to the first and second lateral edges of the marker tags and a second spreader bar to hold the second ends of the first and second support cords at the fixed spacing.

8. The apparatus of claim 2, wherein the substrate is a black polypropylene corrugated sheet material.

9. An apparatus for marking predetermined known overhead positional locations within a coordinate space, for viewing by an image acquisition system, the apparatus comprising:
   a plurality of marker tags, the marker tags being grouped in one or more rows, each row having an axis, the marker tags in a row group being supported by a row support,
   each marker tag comprising:
      an optically opaque, dark colored corrugated substrate, substantially rectangular in shape,
      an adhesive-backed label positioned centrally on the substrate, the label of each marker tag having a unique machine-readable barcode symbology printed thereon, a dark colored border of the substrate surrounding the label;
   each row support comprising:
      a first support cord threaded through a corrugation channel adjacent to the first lateral edge of each substrate for supporting the first lateral edge of the marker tags in a row group in a fixed, spaced-apart positional arrangement, and
      a second support cord threaded through a corrugation channel adjacent to the second lateral edge of each substrate for supporting the second lateral edge of the marker tags in the row group in a slidable support arrangement, a stiff spreader bar at each end of the row group to hold the first and second ends of the first and second support cords at a fixed spacing corresponding to the spacing of the first and second lateral edges of the marker tags, the first support cord being attached to an overhead support structure at each end with a tensioning device, the support cord being drawn to a predetermined tension, thus establishing a substantially straight first lateral row edge, the tensioning devices on the first support cord permitting precise positioning of the marker tag group along the row axis, the second support cord being attached to the support structure at each end with a tensioning device, the support cord being drawn to a predetermined tension, substantially the same as the tension of the first cord; so that the marker tags are supported in a substantially horizontal plane, the labels being readable from below, the slidable support of the second edge of the marker tags allowing the marker tags to align along the first lateral edge along the row axis.

* * * * *